March 7, 1939. C. CHILOWSKY 2,150,050
APPARATUS FOR TRANSLATING VARIATIONS OF ILLUMINATION
INTO MECHANICAL ACTIONS
Filed Sept. 14, 1935 3 Sheets-Sheet 1
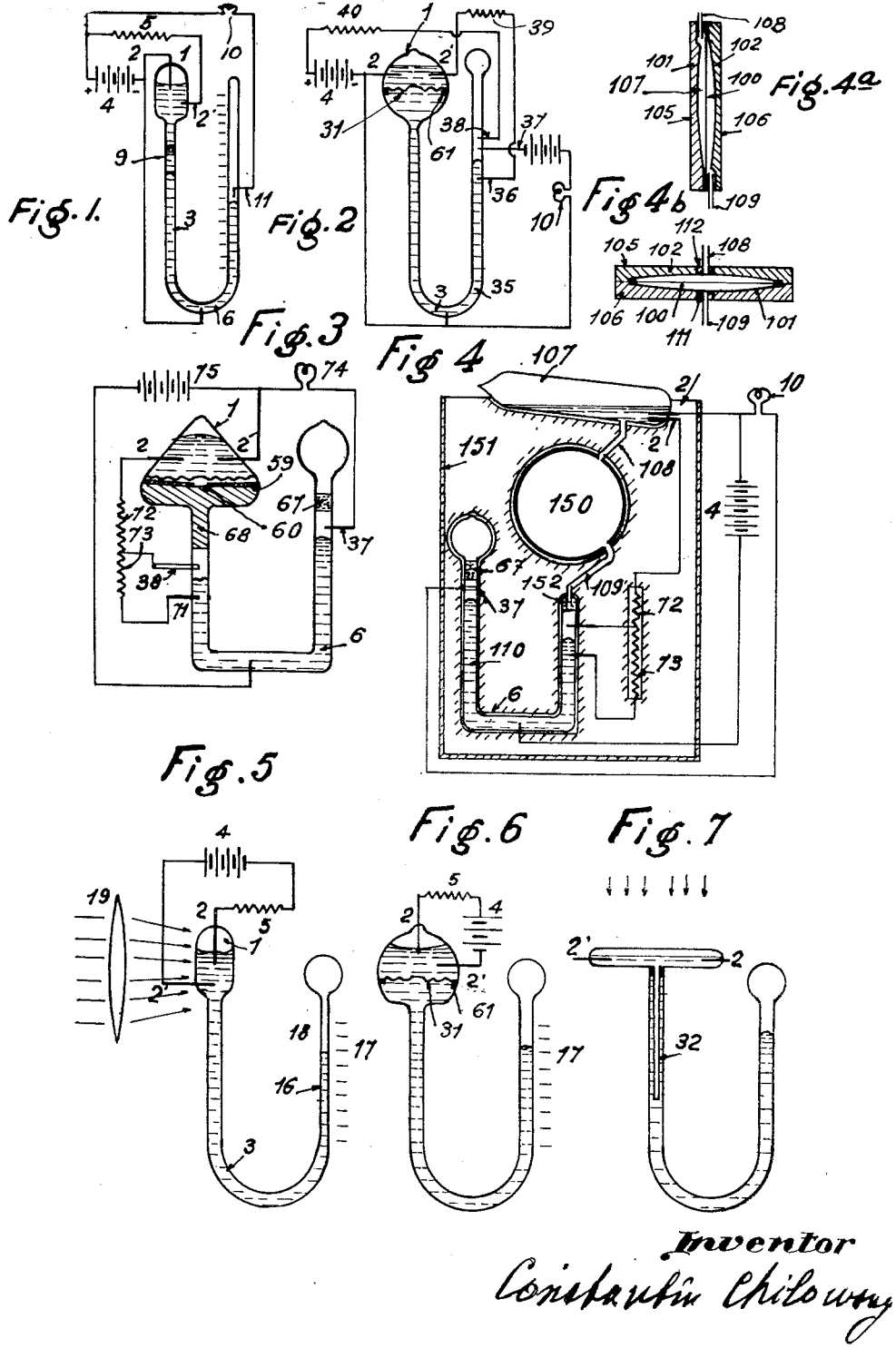
Inventor
Constantin Chilowsky

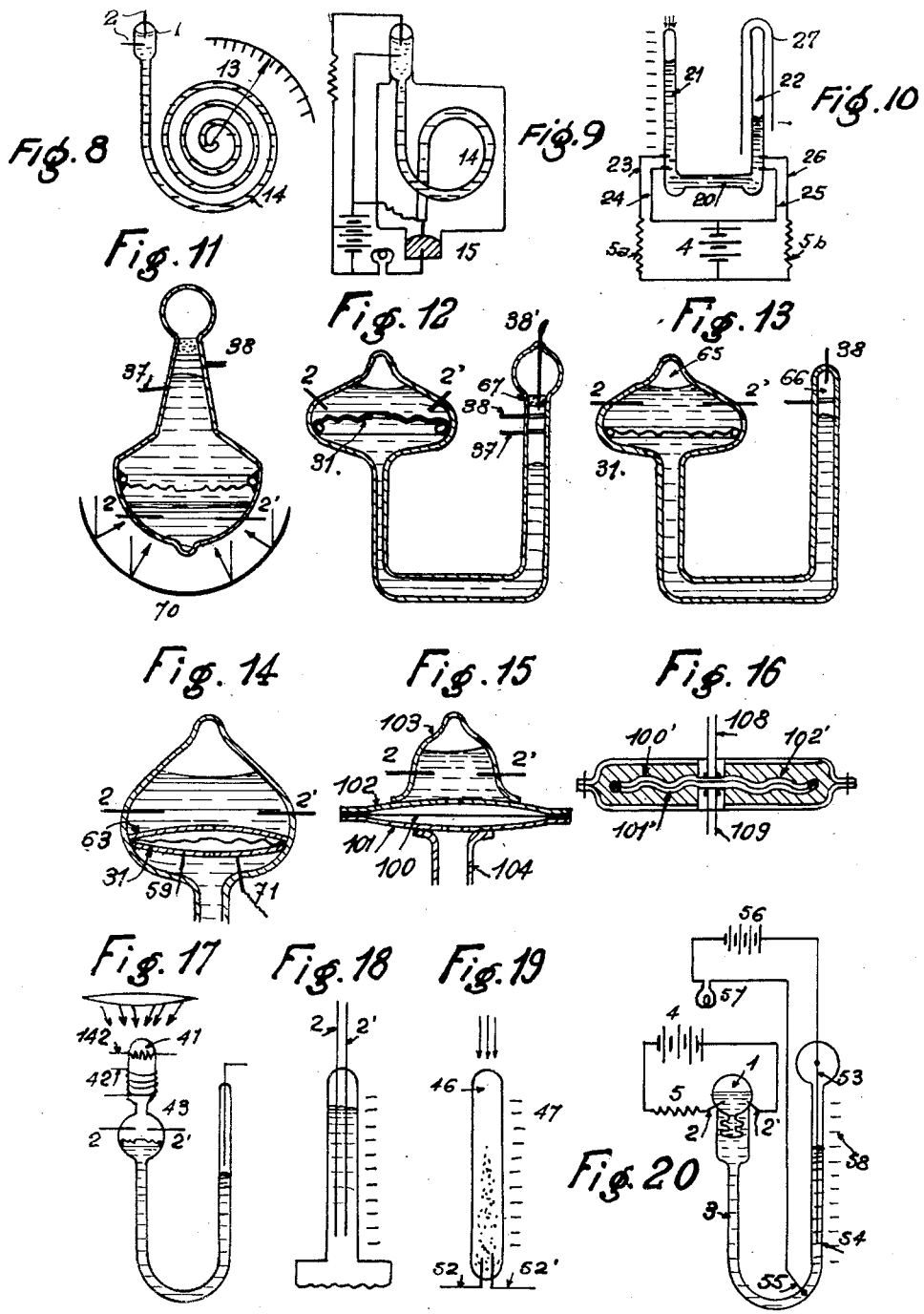

March 7, 1939.    C. CHILOWSKY    2,150,050
APPARATUS FOR TRANSLATING VARIATIONS OF ILLUMINATION
INTO MECHANICAL ACTIONS
Filed Sept. 14, 1935    3 Sheets-Sheet 3
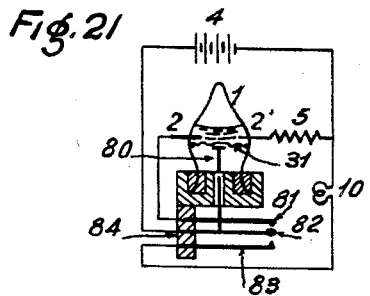
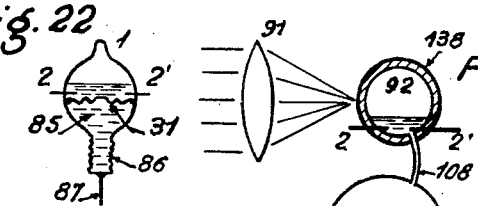
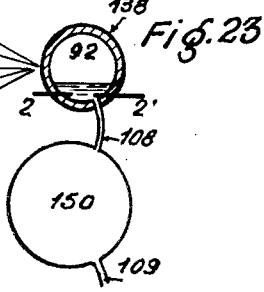
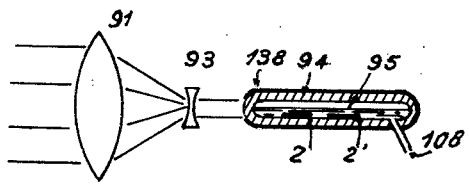
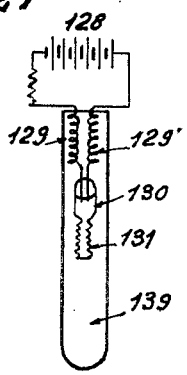
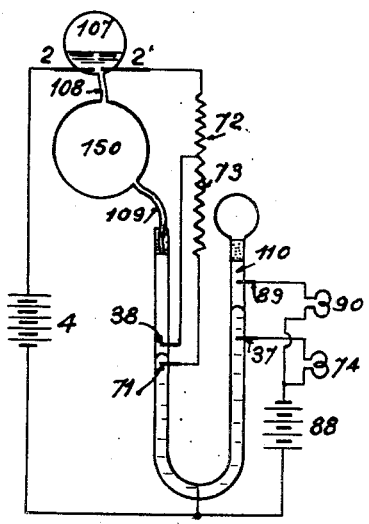
Inventor
Constantin Chilowsky Patented Mar. 7, 1939

2,150,050

UNITED STATES PATENT OFFICE 2,150,050

APPARATUS FOR TRANSLATING VARIATIONS OF ILLUMINATION INTO MECHANICAL ACTIONS

Constantin Chilowsky, Paris, France

Application September 14, 1935, Serial No. 40,657
In Germany January 5, 1935

22 Claims. (Cl. 200—52)

It is known that certain reactions between different gases or between gases and liquids are promoted or accelerated by the action of light, and give rise to variations of volume. Certain other photo-sensitive reactions of the same kind take place without variations of volume, but, as the products of the reaction are readily absorbable by certain liquids, the whole may give rise to variations of volume.

On the other hand, it is known to produce photo-sensitive gases or mixtures of gases through electrolysis of suitable liquids.

The principle of the present invention consists in providing, in a closed vessel of suitable structure, the elements necessary for producing, through electrolysis, photo-sensitive gases, with an increase of volume, and in producing conditions capable of generating in said gases the inverse photo-chemical reactions accompanied by a reduction of volume or associated with secondary physico-chemical reactions accompanied by such a reduction of volume, the whole of these reactions being perfectly reversible and determining a succession of states of equilibrium which are reproduced indefinitely in a closed circuit, without any external intervention, under the only action of the electric currents and of the light, these variations of volume (or corresponding variations of pressure) permitting to transform variations of illumination or of current into mechanical actions, which may be utilized in any suitable manner.

According to an important feature of the invention, the electrolytic current is maintained at a value which may be modified at will, generally a uniform value, or a value which varies automatically according to the volume of the gases that are formed, and the variations of illumination are utilized for producing or controlling the mechanical actions, the latter serving to control electric circuits (for instance to open and close contacts), the whole thus forming an arrangement called "photo-relay".

The same principle may be made use of for measuring or checking up the value of the illumination, by making use of the variations of volume or pressure for moving a suitable index or pointer along a scale, the apparatus built on this principle constituting photometers or the like.

In a general manner, in the apparatus according to the present invention, suitable volumetric or manometric devices are connected with the chambers in which the photo-chemical reactions and the electrolysis take place, in such manner as to form a whole which is so devised as to prevent any interchange of matter between the reaction chambers and the outside.

According to a preferred embodiment of the invention, I make use of the most sensitive photochemical reaction known at the present time, which is the combination of hydrogen and chlorine into hydrochloric gas, taking place without change of volume according to the formula: $H_2 + Cl_2 = 2\ HCl$, this reaction being accompanied by a secondary chemical reaction of absorption of hydrochloric gas by a liquid (such as water, aqueous solutions, hydrochloric acid) giving rise to a decrease of volume. On the other hand, I utilize, for the electrolysis, hydrochloric acid, or preferably, in order to better protect the electrodes, a solution, acidulated preferably with hydrochloric acid, of an alkaline or alkali earth chloride, or any other liquid disengaging, under the effect of electrolysis, chlorine and hydrogen, the hydrochloric gas formed under the action of light being absorbed by the liquid itself which serves to the electrolysis and in the same volume.

Another feature of the invention consists in separating the inside of the reaction chamber or chambers from the remainder of the apparatus by means of organs permitting, on the one hand, to transmit to the outside or to the remainder of the apparatus the variations of volume or pressure that occur inside said chamber or chambers, and, on the other hand, to avoid any chemical action of the chemically active and corrosive matters contained in said chamber or chambers on the other parts of the apparatus, by wholly eliminating any exchange between the inside of said chamber or chambers and the outside.

These organs consist of elastic partitions of any shape and structure whatever and more especially elastic and flexible membranes made of materials that are not attacked by the chemical matters that are made use of, such as chlorine and acids. For instance, it is particularly advantageous to make use of platinum, especially platinum containing a high percentage of iridium, and also of glass.

Another feature of the present invention consists in providing means for modifying a state of mechanical equilibrium of a balanced system subjected to the action of gravity, instead of making use of the variations of volume or pressure directly for acting through volumetric or manometric devices on contacts or indicating devices.

In this embodiment of the invention, I provide a movable system in which the action of gravity is balanced through suitable means (balance, spring, etc.) and I make use of said variations of volume and pressure for breaking or modifying this state of equilibrium, for instance by producing a displacement of a mass of liquid, by varying, under the action of the pressure, the equilibrium of an elastic element floating in a liquid, etc.

According to another feature of the invention, in some embodiments of photo-relays, means are provided in order that the current may be maintained at a constant value, permitting the production of a state of equilibrium, not for the whole range of luminosities, but especially in the vicinity of the critical luminosity, that is to say the luminosity for which the opening of the secondary circuit, or its closing, must take place. Said means are so arranged that, outside this zone, the current is automatically varied, for instance by successive stages, passing from its zero value to any suitable value, these modifications of the value of the current being determined by the action of different contacts included in the photo-relay, said action being controlled in accordance with the different states of equilibrium corresponding to the different luminosities.

According to another embodiment of the invention adapted to the case in which quick, and even very quick, actions are required, I make use not of the slow variations of volume that take place as a result of a gradual succession of different states of equilibrium, but of secondary phenomenons accompanying the modification of these states of equilibrium and resulting from the heating of the gaseous mixture, placed under conditions such that the light produces phenomenons which are relatively rapid, and even explosive, such quick thermic increases of volume (or of pressure) being utilized for instance for closing or opening electric contacts.

Other features of the present invention will result from the following detailed description of some specific embodiments thereof.

Preferred embodiments of the present invention will be hereinafter described, with reference to the accompanying drawings, given merely by way of example, and in which:

Fig. 1 shows a photo-relay according to the invention, including a mercury contact;

Fig. 2 shows another embodiment of the photo-relay of the same kind;

Fig. 3 shows another embodiment provided with another arrangement of the contacts ensuring automatic modifications of the value of the current;

Fig. 4 shows a particular construction of a photo-relay;

Figs. 4A and 4B show two modifications of a portion of the photo-relay of Fig. 4;

Fig. 5 shows an apparatus for measuring illumination made according to the invention;

Figs. 6 and 7 show two modifications of the apparatus of Fig. 5;

Fig. 8 shows a photometer provided with a manometric tube according to the invention;

Fig. 9 shows a photo-relay provided with a manometric tube according to the invention;

Fig. 10 shows a differential apparatus according to the invention;

Fig. 11 shows an apparatus in which light acts on the lower part of the apparatus;

Figs. 12 and 13 show, respectively, two embodiments of a photo-relay provided with special means for limiting the displacements of the partition membrane;

Fig. 14 is a partial view showing another embodiment of a limiting device;

Figs. 15 and 16 show two embodiments of partition membrane and their mounting;

Fig. 17 shows an apparatus the working of which is accelerated by heating;

Fig. 18 shows an apparatus having graduated reaction chambers;

Fig. 19 shows a simplified photometer according to the invention;

Fig. 20 shows a light meter or a device for automatically dosing the light;

Fig. 21 shows a photo-relay with a mechanical control of the contacts;

Fig. 22 shows a modification of the apparatus of Fig. 21;

Figs. 23 and 24 respectively show two different devices for illuminating the reaction chamber;

Fig. 25 shows a quick acting photo-relay according to the invention;

Figs. 26, 27 and 28 show three embodiments of apparatus according to the invention in which the action of gravity is utilized.

In Fig. 1 I have shown a photo-relay according to the invention mounted in a circuit including a lamp 10, the relay being, for instance, intended to switch on this lamp when night falls. Such an arrangement may be utilized in vehicles, for instance automobile vehicles, for the automatic switching on of the headlights when night falls and switching off said lights at daybreak. The arrangement might also be utilized for controlling a street illuminating system, and so on.

In this Fig. 1, I have shown at 1 a vessel made of a transparent material, for instance glass, and at 2 and 2' two electrodes immersed partly in a liquid contained in this vessel, for instance hydrochloric acid. 3 is a U-shaped tube connected at one of its ends with vessel 1. This tube is filled with mercury. The other end of tube 3 is closed, the space above the mercury column 6 being, for instance, and preferably, filled with an inert gas. In this end of the tube is disposed a contact 11. The electrodes 2 and 2' are fed with current through a circuit including a battery 4 and an adjustable resistance 5. At any time, the flow of current decomposes hydrochloric acid into hydrogen and chlorine, which mix together in chamber 1, pushing back the liquid into tube 3. When these gases are subjected to the action of light, they combine together without variation of volume and form hydrochloric gas, the amount of HCl that is formed being proportional, for a given illumination, to the mass of the mixture of H and Cl that is illuminated. Hydrochloric gas, as it is being formed, is absorbed by the electrolytic liquid itself, which reduces the volume.

Consequently, for any given illumination, there is established a state of equilibrium between the gases formed by electrolysis per unit of time and the gases formed under the action of light and also absorbed per unit of time.

To any illumination, therefore corresponds the presence in chamber 1 of a determined and constant amount of gas and, accordingly, a certain height of the mercury column in tube 3.

When the light intensity increases, the amounts of H and Cl combined per unit of time into HCl and immediately absorbed by the liquid increase, the volume of gas in chamber 1 decreases and the level of the mercury column drops. When the intensity of light decreases, the inverse phenomenons take place.

I may perform an adjustment of the height of the column by varying the intensity of the current in such manner that the end of the mercury column comes into contact with terminal 11 at the desired time. This adjustment may, for instance, be carried out in such manner that the contact is closed and lamp 10 is switched on when night falls.

Preferably, in order to avoid the attack of mercury by the chlorine dissolved in the liquid, said mercury is constantly maintained at a negative potential, so that there is continuously formed on its surface a molecular film of hydrogen.

In the embodiment of Fig. 1, the mercury column is, for this purpose, connected to the negative terminal of battery 4.

Eventually, electrode 2 may be dispensed with, the mercury column itself acting as negative electrode disengaging hydrogen. In this case, the apparatus must be completed with a battery intended to constantly keep the mercury at a negative potential.

In order to further protect mercury against an attack by chlorine, and also in order to avoid the infiltration of liquid into the right hand side branch of the U-shaped tube, I may interpose, between the inside of chamber 1 and the column of mercury a partition element permitting the mechanical action of the gases contained inside said chamber on the column of mercury, but preventing, however, these infiltrations and the chemical action of the gases on mercury.

In the embodiment of Fig. 1, this partition element consists of a column 9 of vaseline, paraffin oil, or any other inert and pasty matter, placed between the mercury column and the inside of chamber 1.

However, in the preferred embodiments of the invention, this partition element consists of an elastic membrane. This constitutes an essential and important feature of the invention.

In the embodiment of Fig. 2, such a membrane is shown at 31. In this figure, I have shown at 1 a chamber in which is contained the electrolytic liquid, at 3 the U-shaped tube, at 2 and 2' the electrodes. The apparatus shown in Fig. 2 is arranged in such manner as to further ensure an automatic adjustment of the value of the electrolytic current.

In this embodiment, the right hand side branch 35 of this U-shaped tube is provided, in addition to contact 37, which serves to effect the switching on of lamp 10, with two complementary contacts 36 and 38. These two contacts are located respectively above and below contact 37 and they act as limiting elements intended to maintain the end of the column of mercury always in the vicinity of contact 37.

The lower contact 36 is connected, through a resistance 39 with one of the electrodes, in this case electrode 2', of chamber 1. The other auxiliary contact 38 is arranged to short-circuit the two electrodes 2 and 2' when the column of mercury reaches said contact 38. The circuit further includes a resistance 40, inserted between the positive terminal of battery 4 on the one hand, and electrode 2' and contact 38, on the other hand. The value of this resistance 40 is so calculated that the electrolytic current is higher than that which, for the predetermined value of the illumination, is to flow, through contact 37, through the utilization circuit. With this arrangement, as soon as the mercury column reaches the lower contact 36, the electrolytic current flows through resistance 39 and is reduced to the value for which contact 37 will be closed for the desired degree of darkness. If the darkness becomes too great, the upper contact is in turn reached by the mercury column and it short-circuits the two electrodes, thus cutting off the flow of electrolytic current through the liquid contained in chamber 1.

This last mentioned result can also be obtained by arranging the two electrodes, or preferably one of the electrodes in the upper part of the reaction chamber and in such manner as to extend only down to a certain level. In darkness, the level of the liquid drops below the level of this electrode and the current is cut off. Such an arrangement is shown by Fig. 1, in which the electrode 2 is located in the upper part of chamber 1.

In Fig. 2, I have also shown a feature which is an important characteristic of the present invention. This feature consists in providing a membrane 31 forming a partition between the liquid subjected to the electrolytic action and the column of mercury. As above explained, this membrane constituted a partition element preventing chlorine from attacking mercury, and also making impossible any diffusion or infiltration through the column of mercury toward the upper part of the right hand side branch of the U-shaped tube. This membrane constitutes a fluidtight closing of the reaction chamber proper and it renders said chamber independent from the remainder of the apparatus. Consequently, when such a membrane is provided it becomes unnecessary to provide a wholly fluidtight closing of the right hand side branch of the U-shaped tube, since this membrane prevents any exchange between the outside and the gas and other matters present in the reaction chamber.

Owing to the provision of this membrane, the right hand side branch of the U-shaped tube can be left open, being connected, for instance with a long coiled tube open at its other end, and filled for instance with oil, forming a sufficient closure for protecting the mercury against oxidation, or another liquid, used instead of mercury, against evaporation.

This membrane 31 may be made of any desired material capable of ensuring, on the one hand, elasticity and, on the other hand, fluid tightness and resistance to the chemical effects, as necessary. For instance, this membrane may be made of a metal which is not attacked by chlorine, such as platinum or preferably iridium-platinum. This membrane might also, according to the invention, be made of glass.

When the membrane is made of platinum-iridium, and is given the shape of an undulated disc, it is generally welded in the glass walls of the apparatus. According to the present invention, the edge of this membrane is rendered rigid, for instance by fixing it on the upper side of a metallic ring such as 61 (Fig. 2), made for instance of stainless steel, said ring being located on the side of the membrane which is not in contact with the inside of the reaction chamber.

Alternatively, this ring is replaced by a metallic disc, suitably provided with holes, and the surface of which is slightly concave, so as to permit the membrane to be deflected. This disc is intended to limit the displacements of the membrane and to prevent it from being deformed dangerously in the case of too considerable variations of pressure. Such a disc is shown at 59 in Fig. 3. It is provided with a hole 60 in its central part.

In said Fig. 3, I have shown another embodiment of a photo-relay, in which the automatic adjustment of the value of the electrolytic current is obtained in a different manner. In this figure I have shown at 1 the reaction chamber, at 2 and 2' the electrodes, at 37 the contact of the utilization circuit. 75 is the battery which feeds current to the electrodes. In this embodiment, when the reaction chamber 1 is strongly illuminated, the left hand side extremity of the mercury column 6 touches contact 38' and the value of the electrolytic current is adjusted by resistance 72, of relatively low value. The electric current is thus kept at a relatively high value. On the contrary when the illumination decreases, the level of the left hand side column drops quickly, until it leaves contact 38. From this time on, the electrolytic current automatically becomes lower, owing to the insertion, into the circuit, of a second resistance 73, of relatively high value, and said current reaches its normal value, for which the apparatus is adjusted for the closing of contact 37 when the illumination has a predetermined value. As the left hand column moves further down and the right hand column accordingly further rises, the latter reaches at the desired time contact 37 and closes the utilization circuit, thus switching on, for instance, lamp 74.

If the darkness further increases, the level of the left hand side column leaves, at a certain time, contact 71, and the electrolytic current is thus wholly cut off, since electrode 2 is no longer in contact with the left hand side terminal of the battery. The level of the left hand side column of mercury is thus automatically maintained, by the successive action of the various contacts, at the desired height. I thus obtain a much quicker working of the photo-relay. Besides, it should be well understood that the arrangement of the contacts might be reversed in such manner as to obtain the closing of the secondary circuit for an increase of illumination and not for a decrease.

In Fig. 3 I have also shown a device intended to separate the platinum membrane from the column of mercury by partly filling the space located under the membrane with asbestos, at 68, and partly with inert gases. This arrangement can be carried out very easily and may, for instance, be utilized in apparatus for the automatic switching on of the headlights of an automobile. In order to fill with inert gases the space located below the membrane, and also in order to fill the tube with mercury, etc., I may make use of one of the contacts, for instance contact 38'. In this case, said contact consists of a tube through which this filling operation can be carried out, and subsequently, after being stopped, for instance at its outer end, said tube plays the part of a mere contact. Such an arrangement is also shown by Fig. 3. Beside, I may, according to the invention, utilize these tubular electrodes for all operations, of adjustment, filling, emptying, not only with reference to the U-shaped tube, but also with reference to chamber 1.

As above stated, the displacements of the membrane are preferably limited in order to avoid injury of said membrane under the effect of displacements of too large an amplitude. This limitation may be performed through an organ such as disc 59. Besides a disc of this kind may be provided as well above the membrane, said disc being, in this case made of a matter which is not attacked by chlorine, for instance glass. However, the same result may be obtained merely by limiting the free space above the liquid contained in chamber 1 to a volume of the same order of magnitude as the volume displaced by the maximum displacement of the membrane. In Fig. 3, this space is thus limited in order to obtain this result.

I may also provide another arrangement for limiting the downward displacements of the membrane. This arrangement consists in a porous plug 67, as shown in Fig. 3. The porosity of this plug must be sufficiently fine in order to stop mercury, while allowing the gases to pass. I may, for instance, dispose this plug, consisting advantageously of asbestos, at a distance of some millimeters above contact 37. The mercury column is thus mechanically stopped, and the downward deformations of the membrane are correspondingly limited. In Fig. 3, I have shown two devices for limiting the amplitude of the displacements of the membrane, and, of course, any of these two devices may be dispensed with.

In Fig. 4, I have shown an embodiment of the photo-relay according to the invention in which the whole of the apparatus is practically divided into three portions. One of these portions consists of the reaction chamber proper 107. Another portion consists of a U-shaped tube 110 in which the mercury column 6 can move, and the third portion, extending between these two first mentioned portions, consists of a partition membrane designated as a whole by 150. This kind of apparatus is particularly well adapted to the use of glass membranes, element 150 consisting preferably of a glass chamber divided into two compartments by a flexible membrane of glass. The three portions of the apparatus are connected together through tubes 108 and 109 of small cross section, made of glass or, preferably, of a metal, and which may be of any length whatever. In some special cases, this length may be reduced to zero. With this arrangement, I avoid any danger of explosion under the effect of the heating of the gases located in the reaction chamber.

In Figs. 4a and 4b, I have shown two embodiments of element 150.

Adverting, first, to Fig. 4a, 100 is the membrane proper, consisting for instance of a flexible blade of glass, disposed between two plates 105 and 106 arranged in such manner as to leave free spaces on either side of the flexible blade, respectively. The free space on one side of the membrane communicates, through a tube 108, preferably made of platinum-iridium, with the inside of the reaction chamber 107. The space located on the other side of the membrane communicates through a tube 109 with the U-shaped tube 110.

In a like manner, in the embodiment of Fig. 4b, membrane 100, located between the two plates 105 and 106, is subjected on one side to the action of the gases flowing in through tube 108 and acts, on its other side, on the column of mercury, through the medium of inert gases, through tube 109. In the embodiment of Fig. 4b, tubes 108 and 109, instead of communicating with the spaces located on both sides of the membrane at the periphery thereof, communicate with said spaces in the central parts thereof.

In the embodiments of Figs. 4a and 4b, membrane 100 is disposed between two relatively thin blades, also of glass, 101 and 102, glued to reinforcing plates 105 and 106. The three blades 100, 101 and 102 are glued or welded together along their edges, the tubes being, in turn welded to the blades.

The interval between blades 101 and 102 may be very small, just sufficient for permitting, through the play of the membrane, the necessary displacements of the mercury column, this interval being maintained owing to the gluing of these blades against the reinforcing plates 105 and 106.

I may also, according to my invention, do away with blades 101 and 102, by making plates 105 and 106 of glass of greater thickness, the whole being welded along the periphery. In this case, the interval between the walls of the chamber provided for the membrane is obtained by giving a suitable shape to plates 105 and 106 or by making use of glass plates of suitable curvature.

In the example of Fig. 4b, tubes 108 and 109 are glued or welded to plates 101 and 102, through which they extend, through reinforced glass portions 111 and 112.

The arrangement of Fig. 4 is easy to understand, the U-shaped tube 110 including the same contacts as the corresponding tube of Fig. 3. This embodiment constitutes a very practical and efficient arrangement. The various elements of the apparatus can be inserted in a supporting plate 151, for instance on one or on both sides thereof, in such manner as to constitute a whole which is easy to transport and to fit.

In the embodiment of Fig. 1 I have also embodied a detail of arrangement of the contacts, which, in this example, is applied to contact 37. In order not to modify, by its presence, the section of the passage in which it is located, this contact consists of a ring embedded in the mass of glass and flush with the inner surface of the tube. In the end of tube 110, there is provided a plug 152, which allows the gases to pass but stops the mercury.

In the preceding description, I have disclosed apparatus which are photo-relays.

In Figs. 5, 6, 7 and 8, I have shown the application of the invention to apparatus intended to measure luminous intensities.

Adverting first to Fig. 5, there is shown, at 1, the reaction chamber, at 2 and 2' the electrodes, at 4 the feed battery, and at 5 a resistance. The right hand side column of U-shaped tube 3 is of reduced section, so as to constitute a capillary tube 16. But, in this embodiment, the mercury column is dispensed with and the very liquid present in the reaction chamber constitutes the mass which moves in said U-shaped tube. The right hand side level of this liquid column moves in front of a graduated scale 17 and indicates on this scale either the luminous intensity or the time exposure. The space 18 located above the liquid column is preferably filled with chlorine. When the apparatus is used for indicating time exposures, the light coming from the object to be photographed may be concentrated onto chamber 1 through a lens 19.

In Fig. 6, I have shown an apparatus of the same kind as that of Fig. 5, but in which the liquid column movable in the U-shaped tube is a column of mercury and of any liquid, separated from the inside of the reaction chamber through a membrane 31 of the same type as that described with reference to Fig. 2.

In Fig. 7 I have shown another modification in which the reaction chamber has a flattened shape intended to facilitate the absorption of hydrochloric gas by the electrolytic liquid. In this embodiment, I have also shown a particular construction of the separating, or partition, member, which, instead of consisting of a flat membrane, such as 31, consists of a flattened tube 32, this tube communicating, through its upper end, with the reaction chamber, and being closed at its lower end. This tube is deformed when the pressure inside the reaction chamber varies.

It should be well understood that such a deformable tube can be utilized with other chambers than that shown in Fig. 7 and that, on the other hand, flattened chambers such as that shown in Fig. 7 might be used with membranes as above described, and so on.

In Figs. 8 and 9, I have shown two embodiments of apparatus in which the movable column is replaced by a manometric device, such, for instance, as a manometric tube, preferably made of platinum-iridium or of glass, said tube being arranged, eventually, to actuate either a pointer, in such manner as to constitute a measurement apparatus, or an external secondary contact, in such manner as to constitute a photo-relay.

In Fig. 8, I have shown a measurement apparatus in which the manometric tube 14, the inside of which communicates with the inside of reaction chamber 1 carries an indicating pointer 13.

In the embodiment of Fig. 9, tube 14 carries at its end a contact intended to penetrate into a small cup filled with mercury 15, so as to close the circuit of utilization, this apparatus constituting a photo-relay. It should be well understood that the apparatus of the kind of those shown by Figs. 8 and 9 may also be fitted with partition membranes or the equivalent.

In Fig. 10, I have shown a differential action apparatus, permitting, for instance, to compare the luminosity of any source of light with that of a source of known intensity. The apparatus of Fig. 10 essentially includes two vertical columns 21 and 22, connected together by a communication tube 20 (for instance a capillary tube). In each of these columns are provided two electrodes 23—24 and 25—26, respectively, fed with current from a battery 4, across adjustable resistances 5a and 5b, respectively. Electrolysis takes place in both columns. One of the columns is illuminated by a fixed source of light and the other one by the source of light to be compared. In a modification, one of the columns is covered with a hood such as 27, intended to protect the column against the action of light, either wholly or partly, the other column 21 indicating the luminous intensity and being, for this purpose, provided with graduations.

In Fig. 11, I have shown an apparatus consisting merely of a reaction chamber prolonged by a vertical tube in which the contacts are provided and which is separated from the chamber by a membrane. The reaction chamber is located at the lower part of the apparatus and it is illuminated from the bottom, for instance by means of a suitable concave mirror. The electric circuit may be, for instance, the same as in the embodiment of Fig. 2. In this example, the vertical tube has a slightly conical shape, so as to avoid any separation of the mercury column. It should be well understood that this conical shape of the tube may be used with any embodiment of the invention and is in no way limited to the case of Fig. 11, in which the tube might as well have a cylindrical shape.

In Fig. 12, I have shown a midification of the apparatus shown in Fig. 2. In this embodiment the left hand side branch of the U-shaped tube is made of restricted cross section so as to constitute a capillary tube intended to brake the displacements of the mercury column. Furthermore, this embodiment includes a particular construction of limiting contact 38, which may be replaced by a wire 38', extending through plug 67.

In Fig. 13, I have shown a modification in which the displacements of the membrane are limited in both directions due to the fact that the free spaces provided on the one hand at 65 above the liquid in the reaction chamber, and, on the other hand, at 66, above the free surface of mercury, are very small.

In Fig. 14, I have shown a construction of an organ intended to limit the upward displacements of the membrane. This organ consists of a glass plate 63, of concave shape, provided with a hole in its middle part. The downward displacements of the membrane are limited by a metallic plate 59. In this figure, I have further shown at 71 a metallic contact connected to the supporting plate 59 and projecting through the glass wall on the outside, so as to receive the cathodic potential and transmit it to the membrane.

In Fig. 15, I have shown an embodiment in which the membrane consists of a glass plate 100, both thin and flexible, welded along its peripheral edge between two glass plates, of slightly concave shape, 101 and 102. In this figure, the reaction chamber is shown at 103, the top of the U-shaped tube being shown at 104.

The arrangement of the membranes is the same as shown in Figs. 4a and 4b.

In Fig. 16, I have shown an arrangement analogous to that of Figs. 4b and 15, but in which blade 100', forming the membrane proper, and the two blades 101' and 102' are made of undulated glass glued or otherwise fixed in a suitable outer frame. The whole of these organs is mounted in a suitable support.

In Fig. 17, I have shown an apparatus in which the variations of volume of the gases are accelerated by heating. According to another feature, the chamber filled with liquid and in which electrolysis takes place is separated from, and located as far as possible from, the chamber filled with the gases exposed to the action of light, the heating action being effected only on the vessel containing the gases.

In Fig. 17, I have shown at 41 the chamber containing the gases and heated either through an inner resistance 142 or through an external resistance 42. At 42 is the chamber filled with liquid and at 2 and 2' the electrodes. Part 43 is removed from part 41, the latter being exposed to the action of light. The apparatus of Fig. 17 may also be utilized for obtaining a quick working based on the explosive effect. In this case, the heated part of the apparatus must not, in the normal state, be exposed to a strong light, so as to permit the accumulation of the explosive gases, which are brought into action only when a bright light strikes the chamber in which they are placed. The explosion then occurs and projects the column of mercury into the tube, producing a rapid contact. Such devices may be used in a particularly advantageous manner for repeating signals in locomotives, and in similar applications.

Photo-relays of this kind give a rapid contact as soon as the concentrated light from a signal to be repeated falls thereon, for instance when a locomotive runs past said signal.

In Fig. 25, which will be hereinafter described, some detail arrangements have been disclosed.

In Fig. 18, I have shown an apparatus consisting of a reaction chamber in the form of a vertical tube provided with a graduated scale and carrying, at its lower part an elastic membrane or partition in contact with the atmosphere. In this embodiment, the reaction chamber itself contains the column of liquid intended to give the desired indications by moving in front of the graduated scale.

In Fig. 19, I have shown a considerably simplified apparatus, consisting of a vertical tube, having preferably thick walls, 46, provided with a graduation 47 and filled with a liquid highly saturated with chlorine. Two electrodes 52 and 52', preferably located very close to each other, are provided at the lower part of the tube. The gases that are formed under the action of the electrolytic current ascend in the form of bubbles along the tube and undergo, in the course of this movement, the catalytic action of light, said catalytic action varying with the intensity of said light. On the other hand, the hydrochloric gases undergo a rapid and uniform absorption by the surrounding hydrochloric acid. According to the luminous intensity, the bubbles reach, without being dissolved, a variable height, which may be observed on scale 47, whereby the luminous intensity can be measured.

In the preceding description, it has been assumed that the electrolysis was made by means of a direct current. But it should be well understood that alternating current might also be utilized, choosing, in this case, higher densities of current, and eventually reducing the areas of the electrodes. As a matter of fact, the use of alternating current has the advantage of supplying gases which are already mixed together or nearly entirely mixed together. The use of alternating current is particularly advantageous in the case of the device of Fig. 19.

The principle of the invention may also be applied to the construction of a light meter, or automatic light dosing apparatus, intended for instance to measure or automatically stop the light, when the whole amount thereof that has struck a photographic sensitized paper or the like has reached a predetermined value. Such a device, which is more particularly applicable to photographic printing or to the reproduction of drawings, is shown by way of example in Fig. 20.

The apparatus shown in this figure is of the same kind as that shown in Figs. 2 and 3. It is used in connection with a source of light 57, the amount of light fed by said lamp being intended to be automatically measured. This apparatus works in the following manner: The electrolytic current is first allowed to act on the liquid present in the reaction chamber 1 of the U-shaped tube 3. The gases developed as the result of the reaction taking place in said chamber cause the column of mercury to move upwardly in the right hand side branch of the U-shaped tube, which branch is provided with graduations 58, until the level of the top of this mercury column reaches the desired graduation. At this time, the mercury column covers a certain length of an electrode 53—54 connected with one of the terminals of a battery 56, the other terminal of which is connected to lamp 57. When the level of the mercury has reached the desired height, the reaction chamber 1 becomes subjected to the action of light. This has for its effect, as above explained, to produce a decrease of the volume of the substances contained in said chamber, and therefore a drop of the mercury column in the right hand side branch of the U-shaped tube. When the level of mercury drops below the end 54 of the electrode 53, the circuit of lamp 57 (54, 56, 57, 55) is cut off and the lamp is switched off.

It is also possible to make use of this opening of the circuit for controlling a device intended to ensure the automatic repetition of the working of the apparatus.

It should be well understood that the invention is in no way limited to this particular arrangement, given merely by way of example, and which might be modified without departing from the principle of the invention. For instance, it may be useful, in order to avoid too high a rise of the pressure, and therefore too considerable an upward movement of the column of mercury in the right hand side column of the tube, to provide above said branch a relatively large space. The same device might be used for measuring and dosing invisible radiations (ultra-violet rays).

In Fig. 21, I have shown a photo-relay in which the displacements of membrane 31 are mechanically transmitted to a contact 82, consisting of a blade movable between two contact blades 81 and 83. In this I have shown at 4 the feed battery, at 5 the adjustable resistance, and at 10 the lamp representing the utilization circuit. When the membrane is deformed in the downward direction, rod 80 transmits its movement to blade 82, the right end of said blade is depressed and comes into contact with the end of blade 83, closing the utilization circuit. Blade 81 is devised in such manner as to follow the movement of blade 82, for a certain time. It is only when the utilization circuit is closed and if the illumination further decreases that blade 82 leaves blade 81 and cuts off the current. I have shown at 84 a frame which carries the blades as well as the reaction chamber 1.

In Fig. 22, I have shown another embodiment of a photo-relay in which the displacements of the membrane are mechanically transmitted to a contact. In this embodiment, the portion of the vessel located under the membrane 31 is filled with a fluid which also fills a manometric deformable box 86, prolonging the lower part 85 of the vessel. The end of said deformable box 86 carries a contact 87 which may, for instance, act on a system of blades of the type of that shown in Fig. 21.

The present invention includes several means for rendering the apparatus particularly sensitive to the action of light in order that said apparatus may be more accurate and free from inertia.

The photo-sensitive reaction $H_2 + Cl_2 = 2HCl$ has the maximum of sensitiveness to the action of light when chlorine and hydrogen are mixed in equal proportions.

But, as the electrolytic liquid dissolves a certain amount of chlorine, in order to maintain the desired proportion of chlorine and hydrogen, I reduce the amount of electrolysis liquid in the reaction chamber to the minimum necessary for correctly producing electrolysis and permitting the absorption of hydrochloric gas, the largest part of the volume of the reaction chamber being generally reserved to the gaseous mixture.

For the same purpose, I may utilize a liquid which is saturated with chlorine and previously fill the volume of the chamber with an atmosphere of chlorine the amount or the pressure of which, in order to obtain the maximum sensitiveness, must generally increase with the portion of the volume occupied by the liquid present in the reaction chamber.

In order that the equilibrium between the liquid and the various gases that are present in the chamber may be obtained as quickly as possible, I give said chamber a sufficiently compact shape (for instance spherical or flattened) in order that the liquid may have a sufficient contact with the gas, avoiding the presence of thick layers and of long columns of liquid.

However, I may also make use of reaction chambers in the form of elongated tubes, and even of capillary tubes, by placing these tubes horizontally, with the electrodes disposed at suitable points along these tubes.

The use of partition membranes between the reaction chamber and the remainder of the apparatus permits, in particular, of giving the chambers compact shapes, whereby the equilibrium is established in a very short time. Accordingly, it is advisable to make use of these membranes also when the indicating column is not a column of mercury, but a column of any liquid (for instance in the case of photometers).

However, in the case of apparatus which are apt to be subjected to very considerable and very sudden light variations, explosions, or disturbances of a thermic character could occur (for instance under the action of the sun rays).

In order to obviate this drawback, according to my invention, I introduce, into the combustion chambers a certain amount of inert matters which cannot be attacked by the substances present in said chambers, said inert matters having a large area and being preferably transparent. I may for instance make use of a small amount of glass cotton occupying, with a low density the volume intended for the gases (and distributed in a manner as homogeneous as possible) or again flakes, grains or threads or glass, quartz, etc., the presence of which prevents a sudden rise of temperature and therefore explosion from taking place.

The same result can be obtained by using a shape of chamber in which the layer of gas is thin and in immediate contact with the liquid layer or the solid walls.

I may also, according to the invention, render the apparatus less sensitive, for instance by creating conditions in which the mixture of chlorine and hydrogen is not produced in equal proportions but with an excess of one of these gases, and more especially of hydrogen.

However, in the case of apparatus having manometric organs and when said organs require a high pressure, or when little flexible membranes are used, I find that it is advantageous, according to my invention, to fill a great part of the combustion chamber, if not the whole thereof, with an electrolytic liquid highly saturated with chlorine, for instance under pressure, making use, preferably, of chambers of small volume with respect to that of the manometric system that is employed.

In this case, as in all cases in which a high photosensitive pressure work is required from the reaction, the gases may be disengaged under the action of electrolysis at high pressure, eventually as high as several atmospheres, the chamber being previously filled with chlorine under pressure.

The combination of chlorine and hydrogen being accompanied with a disengagement of heat, any increase of illumination of the gaseous mixture produces an increase of its temperature and an increase of the volume of the gases. But in chambers of small size, and also in chambers in which the layers of gaseous mixture are small and very close to the solid walls of the chambers, these rises of the temperature and of the gaseous volume are little important, the heat being immediately dissipated.

According to an embodiment of the present invention, the apparatus is devised in such manner as to create conditions in which the thermic phenomenons, that is to say the variations of temperature of the gaseous mixture which accompany the variations of illumination, become considerable and are no longer superseded by the relatively slow phenomenons of gradual transformation of equilibrium. In this embodiment of the invention, I make use of these thermic phenomenons and of the corresponding variations of volume for the quick, although generally temporary, opening or closing of an electric circuit, and also for the measurement of the luminous intensity. In this case, the column of mercury is given, for instance under the action of a sudden illumination, a quick displacement (in the direction opposite to that in which it would move under the effect of gradual variations of the state of equilibrium) this displacement being due to the sudden expansion of the gases, and being followed by a return in the opposite direction to a position of equilibrium which corresponds to said illumination.

For this purpose, according to my invention, I arrange the reaction chamber in such manner as to eliminate the causes of quick dissipation of heat, to wit: I make use of chambers of greater size and of compact shape (for instance of spherical shape) so as to increase the volume with respect to the area.

I make use of gaseous mixtures which are especially sensitive. I cause the reaction chambers to be subjected preferably to sudden light variations and especially sudden switchings, on and off, of the light, at short intervals of time. (This makes it possible to eliminate or to reduce the successive states of equilibrium).

According to an important feature of my invention photo-relays of the kind just above referred to are provided with means for stabilizing the column of mercury within relatively narrow limits, at a determined height, through a set of suitable contacts, for instance a set of two contacts the upper one of which brings the electrolytic current up to a maximum value while the lower one cuts off said current. The arrangement is analogous to that of Fig. 3, but with the essential difference that the working contact (for the circuit of utilization) in the second branch of the mercury column is not located in the zone between the normal limits of stabilization of the column of mercury by the successive states of equilibrium, but outside of this zone, and for instance above it. Besides, the upper contact might eventually be sufficient.

Fig. 25 diagrammatically shows such a device. In this figure I have shown at 107 the reaction chamber, at 150 the membrane, and at 110 the U-shaped tube. 108 and 109 are the communication tubes, 4 is the battery, 38 and 71 are the limiting contacts and 72 and 73 are the resistances combined with these contacts. The working contact for the quick operation of the apparatus is shown at 89 and closes a utilization circuit 90 brought into play outside of the zone located between the normal limits of working.

Of course, the limiting contacts are located very close to each other. In the case of slow variations of light, the mercury column is maintained by the action of the two contacts between these limits 38 and 71. But the relatively rapid variations of light, by producing a heating and therefore a rapid increase of pressure and volume before the stabilizing contacts have had time to play their part, project the column of mercury outside of the zone of stabilization, where this column closes contact 89.

In this embodiment I have also provided an arrangement ensuring the quick working when passing suddenly from a bright light to darkness, with a corresponding drop of temperature of the gaseous mixture. For this purpose, I have provided an auxiliary circuit including a contact 37, a source of current 38 and a circuit of utilization 74. Contact 37 is broken when there is a sudden passage from a bright light to darkness. In apparatus of this kind, it is of course necessary to provide means for ensuring a sufficiently quick cooling of the gaseous mixture.

It is thus possible to produce sudden actions without having necessarily recourse to ultraquick or explosive phenomenons.

Of course, the sensitiveness and quickness of operation of these apparatus are greatly increased by concentrating light onto the reaction chamber by means of suitable lenses or mirrors.

In a general manner, according to my invention, means may be provided for increasing in some cases the efficiency of the action of light on the photo-relays or measurement apparatus according to the invention, as well when the apparatus works by gradual transformation of states of equilibrium as when use is made of thermic actions.

For this purpose, I direct onto the reaction chamber the strongly concentrated light, the focus of which shall be located substantially at the center of the gaseous volume.

Highly superior results can be obtained by making use of chambers silver-plated on the outside over their whole surface, with the exception of a small area which is not silver-plated. The light, in the form of a strongly concentrated beam falls upon this area, which corresponds to the focus of the light beam. This light beam, undergoing a very great number of successive reflections, against the inner reflecting surface of the chamber, and passing a great number of times through the same gaseous mass, produces photochemical effect which are several times greater.

An embodiment of such an arrangement is shown in Fig. 23. The glass reaction chamber is shown at 92. This chamber is silver-plated on the outside at 138. The light rays, concentrated by a lens 91, fall upon a small area of the surface of the chamber which is not silver plated.

In Fig. 24, I have shown another arrangement for obtaining a powerful lighting of the inside of the reaction chamber.

In this embodiment, the chamber is given the shape of a long tube, of small diameter, eventually a capillary tube, 95, preferably silver-plated on the outside, as shown at 94.

The light, concentrated first by a lens 91, is directed onto a lens 93, which produces a concentrated rectilinear beam, extending in the direction of the length of the chamber and passing through the whole column of gas. Furthermore, this light beam is eventually reflected by the silverplated wall.

As above mentioned, there is an embodiment of the invention in which, instead of making of variations of volume or pressure of the gases contained in the reaction chamber for acting directly on manometric or volumetric devices, the variations of volume or pressure are utilised for modifying or destroying a mechanical state of equilibrium, the action of gravity being made use of for producing the desired displacements. In order to carry out an apparatus of this kind, I made use of a movable system in which the action of gravity is balanced through any suitable means, such as a counterweight, springs, etc., and I cause the variations of volume or pressue in the reaction chamber to act for destroying or modifying this state of mechanical equilibrium. This result may be obtained by producing a suitable displacement of a mass of liquid, a modification of the density of a body immersed in a liquid, etc. The displacement resulting from the action of gravity may be utilized, for instance, for closing the contact of an electric circuit, etc.

In Figs. 26, 27 and 28, I have shown three embodiments of apparatus of this kind.

In Fig. 26, I have disclosed an apparatus consisting of two chambers 122 and 124, communicating together through a tube 125, the whole of these parts being adapted to pivot about an axis 121. The apparatus further includes a pivoting mercury switch 120 of any suitable type or an equivalent contacting device. In one of the chambers, for instance chamber 122, or eventually in both chambers (in the case of a differential apparatus) there are provided two electrodes 123 and 123', in such manner as to produce photo-sensitive gases in the manner above described.

According to the light intensity, the amount of liquid in chamber 122 varies in such manner as to be able to become greater or smaller than the amount of liquid in chamber 124. The system, acting as a balance, oscillates toward the right or toward the left. The mercury switch includes a central current lead 143 and output terminals located in small cups 127 and 126 respectively. Consequently, when the system is pivoted in one direction or the other, the circuit is closed between terminal 143 and one of the terminals 144 or 145.

In Fig. 27 I have shown another embodiment also based upon the action of gravity. In this embodiment, an electrolytic deformable box 130 is freely suspended in the liquid filling vessel 139. The electrolytic current may be fed to the electrodes through springs 129 and 129', to which this deformable box is suspended. The electrodes are inserted in a circuit including a source of current 128 and an adjustable resistance. The deformable portion 131 of box 130 consists for instance of tube of flat section or of an undulated membrane. Vessel 139, and of course the liquid with which it is filled, must be transparent in order to permit the action of light on the contents of chamber 130. When the light intensity varies, the total volume of system 130—131 also varies according to the state of equilibrium produced by the opposed actions of light and of the electric current. Consequently the system 130—131 moves upwardly when the light intensity decreases and downwardly when said intensity increases. The displacement of body 130 may be utilized for instance for closing a contact or for any other purposes.

In Fig. 28, I have shown another embodiment in which a closed chamber 133 is filled with electrolytic liquid and comprises two electrodes 2 and 2' fed with current from a source 134. Inside chamber 133, there is disposed a closed body 132 the volume of which can vary under the effect of the pressure (hollow body of flat shape, manometric box of platinum or glass). Body 132 is connected through a spring 140 with the bottom of vessel 133. Under the effect of variations of the pressure inside chamber 133, tube 132 has a tendency to move for instance toward the top or toward the bottom and it permits either the closing of a contact or the measurement of the illumination. It should be well understood that apparatus of the type described with reference to Figs. 26, 27 and 28 may be inserted in suitable circuits, and, in particular, may be provided with limiting contacts.

It is obvious that, as well in the case of Fig. 23 as in that of Fig. 28, I might, instead of providing deformable bodies (131 and 132), provide bodies the inside of which communicates with the mass of liquid in which they are immersed.

In all apparatus according to the invention, it is preferable to make use, in the reaction chamber, of electrodes of platinum, and more particularly of platinum-iridium containing a high percentage of iridium. However, in some cases, I may also make use of electrodes of carbon or graphite or any other material which is not attacked by chlorine.

The thermic coefficient of the photo-chemical reaction $H_2+Cl_2=2HCl$ is practically equal to zero. However, it has been noted that in most cases, the device has a positive thermic coefficient. In order to compensate for this coefficient, it is provided, according to the invention, to introduce in series with the electrolytic current a resistance which increases the intensity of the current when the temperature rises or any other known compensation device.

This compensation can also be obtained, according to the invention by making use of a composite system of two blades made of metals having different coefficients of expansion, arranged to stop in a variable manner, as a function of the temperature, by means of a movable screen the flow of light to the reaction chamber.

In the preceding description, I have mentioned nearly exclusively apparatus in which use is made of the reactions of chlorine and hydrogen. It should be well understood that other chemical bodies may also be employed, for instance hydrobromic acid, which is decomposed by electrolysis into bromine and hydrogen, these two gases combining again, although much more slowly, under the action of light.

I may also make use of the electrolysis of water and the subsequent combination of hydrogen and oxygen under the action of light in the presence of chlorine.

Finally, I may also, according to the invention, in order to stabilize or at least favorably influence the thermic coefficient of the apparatus, act on the chlorine concentration by introducing into the reaction chamber substances absorbing variable amounts of chlorine according to the temperature, for instance carbon.

The apparatus according to the present invention may receive many applications among which some will be hereinafter stated.

The photo-chemical reaction that is utilized being particularly sensitive to green, blue, violet and ultra-violet rays, and practically uninfluenced by red rays, the apparatus may be used when it is desired to avoid the disturbances produced by artificial light for instance public lighting which contains a much greater proportion of red rays than for instance day light.

The invention may be also applied to the automatic lighting of the headlights and other lighting apparatus of an automobile vehicle, when night falls.

The invention can also be applied to the construction of exposure-meters for photography, owing to the fact that said reaction is particularly sensitive to violet and ultra-violet rays, same as photographic plates, which avoids the necessity of corrections.

The invention may also be applied to the detection of fire, through the production of smoke, and also to the control of smoke in industrial chimneys. This is due to the fact that rays of short wave-length, to which the apparatus according to the invention are sensitive, are more easily absorbable by smokes.

Besides these examples of application, which corresponding to a relatively slow working of the apparatus, to which may be added all applications concerning the control of the switching on and off of public or private lighting, lighthouses, and the like, there exist other applications concerning the quick, and even ultra-quick, working of the device.

In particular, the apparatus according to the invention may be utilizing for signalling or controlling from a distance by means of invisible or little visible rays, and especially extreme violet and ultra-violet rays.

For this purpose, I make use, for illuminating the reaction chamber, of sources of ultra-violet light, for instance mercury arcs, or even sources of artificial light fitted with filters absorbing the visible rays and allowing the invisible rays to pass. Such arrangements are especially adapted to the provision of burglar alarm systems, secret communications or telecontrol, control or dosing of ultra-violet rays, medical treatments, photographic and industrial reproduction of pictures and drawings, etc.

A great number of applications are also possible with ordinary artificial light.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. An apparatus of the type described which comprises, in combination, a closed rigid vessel having a gas space adapted to be exposed to the action of light, a liquid in said gas space electrolytically transformable into at least two gases such that they combine together under the action of light with a resulting reduction of the total volume of the liquid and gases, electrolytic means for acting on said liquid, at least one stationary electric contact element inside said vessel, and a movable contact element adapted to cooperate therewith and constituted by a column of an electricity conducting liquid movable inside said vessel in response to variations of said total volume.

2. An apparatus of the type described which comprises, in combination, a closed rigid vessel having a gas space adapted to be exposed to the action of light, a liquid in said gas space electrolytically transformable into at least two gases such that they combine together under the action of light with a resulting reduction of the total volume of the liquid and gases, electrolytic means for acting on said liquid, at least one stationary electric contact element inside said vessel, and a movable contact element adapted to cooperate therewith and constituted by a column of an electricity conducting liquid arranged as an extension of said liquid and gases inside said vessel so as to be movable therein in response to variations of said total volume.

3. An apparatus of the type described which comprises, in combination, a closed rigid vessel having a gas space adapted to be exposed to the action of light, a liquid in said gas space electrolytically transformable into at least two gases such that they combine together under the action of light with a resulting reduction of the total volume of the liquid and gases, electrolytic means for acting on said liquid, at least one stationary electric contact element inside said vessel, a movable contact element adapted to cooperate therewith, and constituted by a column of an electricity conducting liquid arranged as an extension of said first liquid mentioned inside said vessel so as to be movable therein in response to variations of said total volume, and means, interposed between one end of said column and the system of gases and liquid, for chemically protecting said column against the action of said liquid and gases.

4. An apparatus of the type described which comprises, in combination, a closed rigid vessel having a reaction chamber adapted to be exposed to the action of light, a liquid in said chamber electrolytically transformable into at least two gases such that they combine together under the action of light with a resulting reduction of the total volume of the liquid and gases, a flexible fluidtight partition closing said reaction chamber, electrolytic means for acting on said liquid, at least one stationary electric contact element inside said vessel, a movable contact element adapted to cooperate therewith and constituted by a column of an electricity conducting liquid, and a fluid mass interposed between said partition and one end of said column whereby the latter is movable inside said vessel in response to variations of said total volume of the gases and the first mentioned liquid.

5. An apparatus according to claim 1 further including means for heating the portion of said vessel that contains said gases, in such manner as to produce quick variations of volume and pressure of said gases in response to heating and cooling thereof resulting from sudden variations of the light intensity, these quick variations of volume and pressure taking place in opposite relation to the relatively slow variations that correspond to gradual transformations of the state of equilibrium.

6. An apparatus according to claim 4 in which said partition consists of a flexible membrane of platinum-iridium welded along its peripheral edge to the walls of said chamber.

7. An apparatus according to claim 4 in which said partition consists of a flexible glass membrane.

8. An apparatus according to claim 4 in which said partition consists of a flexible glass membrane and two glass plates located on either side of said membrane, respectively, the whole being welded together along the peripheral edges of said parts, further including means for connecting the space between said glass membrane and one of said glass plates with said chamber.

9. An apparatus according to claim 4 in which said partition consists of a mass of a pasty liquid in contact with the electrolytic liquid in said chamber.

10. An apparatus of the type described which comprises, in combination, a closed rigid system including a U-shaped tube and a reaction chamber adapted to be exposed to the action of light at the top of one of the branches of said tube and in communication therewith, a liquid in said chamber electrolytically transformable into at least two gases such that they combine together under the action of light with a resulting reduction of the total volume of the liquid and gases, electrolytic means for acting on said liquid, at least one stationary electric contact element in the upper part of one of the branches of said U-shaped tube, a movable contact element adapted to cooperate with said first mentioned contact element and constituted by a column of an electricity conducting liquid movable inside said U-shaped tube in response to variations of said total volume, and an electric terminal permanently immersed in the liquid of said column.

11. An apparatus according to claim 10 in which said tube is located above said chamber, the means for permitting light to act on the gases in said chamber being so arranged as to direct light upwardly upon said chamber.

12. An apparatus according to claim 1 in which said vessel forms a horizontal chamber of small height for said liquid and said gases.

13. An apparatus of the type described which comprises, in combination, a closed rigid vessel including a U-shaped tube and a reaction chamber adapted to be exposed to the action of light at the top of one of the branches of said tube and in communication therewith, a liquid in said chamber electrolytically transformable into at least two gases such that they combine together under the action of light with a resulting reduction of the total volume of the liquid and gases, electrolytic means for acting on said liquid, at least one stationary electric contact element in the upper part of one of the branches of said U-shaped tube, a movable contact element adapted to cooperate with said first mentioned contact element and constituted by a column of an electricity conducting liquid movable inside said U-shaped tube in response to variations of said total volume of the gases and the first mentioned liquid, an electric terminal permanently immersed in the liquid of said column, and stabilizing means for varying the value of the electrolytic current when the liquid in said tube moves beyond certain limits whereby said liquid is maintained normally within said limits.

14. An apparatus according to claim 13 in which said stabilizing means include two auxiliary electrodes provided in the branch of the U-shaped tube containing said first mentioned contact element, said electrodes being located one above said stationary contact element and the other below said contact, connections between said first auxiliary electrode and the electrolytic means adapted to short circuit said electrolytic means when the liquid in said tube reaches said first auxiliary electrode, and a resistance interposed between said second auxiliary electrode so as to reduce the flow of current through said electrolytic means when the liquid in said tube reaches said second auxiliary electrode 15. An apparatus according to claim 13 in which said stabilizing means include two auxiliary contacts provided in the branch of the U-shaped tube that contains the first mentioned contact element, a certain amount of inert gas being provided in said branch of the U-shaped tube above the liquid therein, and resistance inserted between said auxiliary contacts and the electrolytic means so as automatically to maintain the surface of the liquid in said branch between these two auxiliary contacts.

16. An apparatus according to claim 10 in which said electrolytic means include two electrodes at least one of which is located at the top of said chamber, whereby the current through said electrolytic means is automatically cut off when the level of the liquid in said chamber drops below the level of the lowest point of said electrode.

17. An apparatus according to claim 10 further including means for braking the displacement of said column of liquid in said tube.

18. An apparatus according to claim 10 further including a porous plug in said tube capable of stopping the liquid therein but allowing the gas above said liquid to flow through said plug.

19. An apparatus according to claim 3 further including means for limiting the deformations of said protecting means.

20. An apparatus of the type described, which comprises, in combination, a closed rigid system including a U-shaped tube, a vessel, a second vessel forming a reaction chamber adapted to be exposed to the action of light, a flexible membrane dividing said first mentioned vessel into two spaces, conduits connecting one of said spaces with said chamber and the other space with said tube, respectively, whereby the closed system is divided into three portions, one consisting of the reaction chamber, the second consisting of the first mentioned vessel with the membrane therein, and the third consisting of the U-shaped tube, a liquid in said reaction chamber electrolytically transformable into at least two gases such that they combine together under the action of light with a resulting reduction of the total volume of the liquid and gases, electrolytic means for acting on said liquid, at least one stationary electric contact element in the upper part of one of the branches of said U-shaped tube, a movable contact element adapted to cooperate with said first mentioned contact element and constituted by a column of an electricity conducting liquid movable inside said U-shaped tube in response to variations of said total volume of the gases and the first mentioned liquid, and an electric terminal permanently immersed in the liquid of said column.

21. An apparatus of the type described, which comprises, in combination, a closed rigid system including a U-shaped tube, a vessel, a second vessel forming a reaction chamber adapted to be exposed to the action of light, a flexible membrane dividing said first mentioned vessel into two spaces, conduits connecting one of said spaces with said chamber and the other space with said tube, respectively, whereby the closed system is divided into three portions, one consisting of the reaction chamber, the second consisting of the first mentioned vessel with the membrane therein, and the third consisting of the U-shaped tube, a liquid in said reaction chamber electrolytically transformable into at least two gases such that they combine together under the action of light with a resulting reduction of the total volume of the liquid and gases, electrolytic means for acting on said liquid, at least one stationary electric contact element in the upper part of one of the branches of said U-shaped tube, a movable contact element adapted to cooperate with said first mentioned contact element and constituted by a column of an electricity conducting liquid movable inside said U-shaped tube in response to variations of said total volume of the gases and the first mentioned liquid, an electric terminal permanently immersed in the liquid of said column, and stabilizing means for varying the value of the electrolytic current when the liquid in said tube moves beyond certain limits whereby said liquid is normally maintained between said limits.

22. An apparatus according to claim 20 in which said first mentioned vessel forms a lens-shaped chamber of relatively small thickness, said membrane being parallel to the general plane of said lens-shaped chamber.

CONSTANTIN CHILOWSKY.